United States Patent [19]

Ishida

[11] Patent Number: 5,367,457
[45] Date of Patent: Nov. 22, 1994

[54] APPARATUS AND METHOD FOR IMPROVING ACCURACY OF AN AUTOMATIC TRAVELLING APPARATUS

[75] Inventor: Shinnosuke Ishida, Saitama, Japan

[73] Assignee: Honda Giken Kogyo Kaubishiki Kaisha, Tokyo, Japan

[21] Appl. No.: 71,222

[22] Filed: Jun. 1, 1993

Related U.S. Application Data

[63] Continuation of Ser. No. 670,332, Mar. 15, 1991, abandoned.

[30] Foreign Application Priority Data

Mar. 15, 1990 [JP] Japan .................................. 2-64586

[51] Int. Cl.$^5$ .............................................. G06F 15/50
[52] U.S. Cl. ............................... 364/424.02; 364/456; 180/169; 348/116; 348/119
[58] Field of Search ....................... 364/424.01, 424.02, 364/443, 449, 456; 180/167, 169; 358/103; 318/587; 382/1; 395/905, 94

[56] References Cited

U.S. PATENT DOCUMENTS

| | | | |
|---|---|---|---|
| 4,926,346 | 5/1990 | Yokoyama | 364/424.02 X |
| 4,970,653 | 11/1990 | Kenue | 364/424.02 X |
| 5,081,585 | 1/1992 | Kurami et al. | 364/424.02 |
| 5,122,957 | 6/1992 | Hattori | 364/424.02 |
| 5,163,002 | 10/1992 | Kurami | 364/424.02 |
| 5,172,315 | 12/1992 | Asanuma et al. | 364/424.02 |

FOREIGN PATENT DOCUMENTS 0248704 2/1990 Japan .

OTHER PUBLICATIONS

"ALVINN: An Autonomous Land Vehicle in a Neural Network," *Advances in Neural Information Processing Systems 1*, D. S. Touretzky (Ed.), Morgan Kaufman, Dec. 1988, pp. 305–313.

"On Lateral Control of Highway Vehicles Guided by a Forward Looking Sensor", Liu et al., International Conference on Applications of 1989, Department of Mechanical Engineering, University of California at Davis, Dec. 1989, pp. 119–124.

*Primary Examiner*—Vincent N. Trans
*Attorney, Agent, or Firm*—Lyon & Lyon

[57] ABSTRACT

Disclosed is an automatic travelling apparatus which is capable of taking an image of an area ahead of a vehicle by an image pick-up means attached to the vehicle; sampling and processing the image data to extract therefrom continuous line segments; determining a permissible travelling area ahead of the vehicle on the basis of the continuous line segments extracted; setting a target course in the permissible travelling area thus determined; detecting the instantaneous running condition of the vehicle; estimating, on the basis of the instantaneous running condition, a steering amount to permit the vehicle to follow the target course; and steering the vehicle with reference to the steering amount, and furthermore of renewing, on the basis of the instantaneous running condition during a period of image sampling, the preceding position of the vehicle in the permissible travelling area and reset a target course in the permissible travelling area in relation to the renewed position.

3 Claims, 7 Drawing Sheets

APPARATUS AND METHOD FOR IMPROVING ACCURACY OF AN AUTOMATIC TRAVELLING APPARATUS

This is a continuation of co-pending application Ser. No. 07/670,332, filed on Mar. 15, 1991 now abandoned.

BACKGROUND OF THE INVENTION

The present invention relates to an automatic travelling apparatus capable of identifying a permissible travel path for the purpose of permitting a vehicle to automatically run on a road.

Recently, there has been developed an automatic travelling apparatus which is capable of identifying a permissible travel path, setting a target course thereon and steering a vehicle to run along the target course.

The automatic travelling apparatus disclosed in Japanese laid open patent publication No. 199610-88 continuously generates an image of an area ahead of a vehicle and in the vehicle's running direction using an image pick-up device attached to the vehicle. The apparatus samples the image thus generated and extracts therefrom continuous line segments such as road edges. The apparatus then determines a permissible travel path ahead of the vehicle based on the extracted continuous line segments and sets a target course in the determined permissible travel path. Next, the apparatus estimates a steering correction necessary to allow the vehicle to follow the target course based on the currently detected running condition of the vehicle and, based on the steering correction, steers the vehicle to follow the target course.

Because the above-mentioned automatic travelling apparatus performs the steering control of the vehicle at repeated sampling intervals, the steering control will be more accurate as the sampling period i.e., steering control cycle, is made shorter.

However, where the processing of generated image data is performed by a microcomputer or like means, the processing may take a rather long time because an image of an area ahead of the vehicle may be complicated and may include a large amount of information to be processed. Thus, it is often difficult to reduce the control cycle time of an image processing system.

The time required for processing each image and for determining a permissible travel path is fairly long in comparison with the processing time required for steering the vehicle to follow the target course set in the permissible travel path. For example, where image processing may take 500 milliseconds to complete, the processing time required for steering control may take only 10 milliseconds.

If the image processing time is extended, the vehicle may travel enough to produce a deviation from its actual position with respect to the determined permissible travel path, causing a considerable decrease in accuracy of the steering control. It will be noted that, as the running speed of the vehicle increases, the amount of deviation will also increase.

SUMMARY OF THE INVENTION

In view of the foregoing, the present invention is directed to an automatic travelling apparatus which is capable of recalculating the position of a vehicle relative to the permissible travel path, which is given for the current control cycle, based on the actual running condition of the vehicle. Thus, the apparatus is capable of resetting a corresponding target course in the permissible travel path in response to the recalculated vehicle position. In this fashion, deviations of the actual position of the vehicle with respect to the permissible travel path may be minimized even if the image processing time is extended.

DESCRIPTION OF THE PREFERRED EMBODIMENTS

Figure 1:
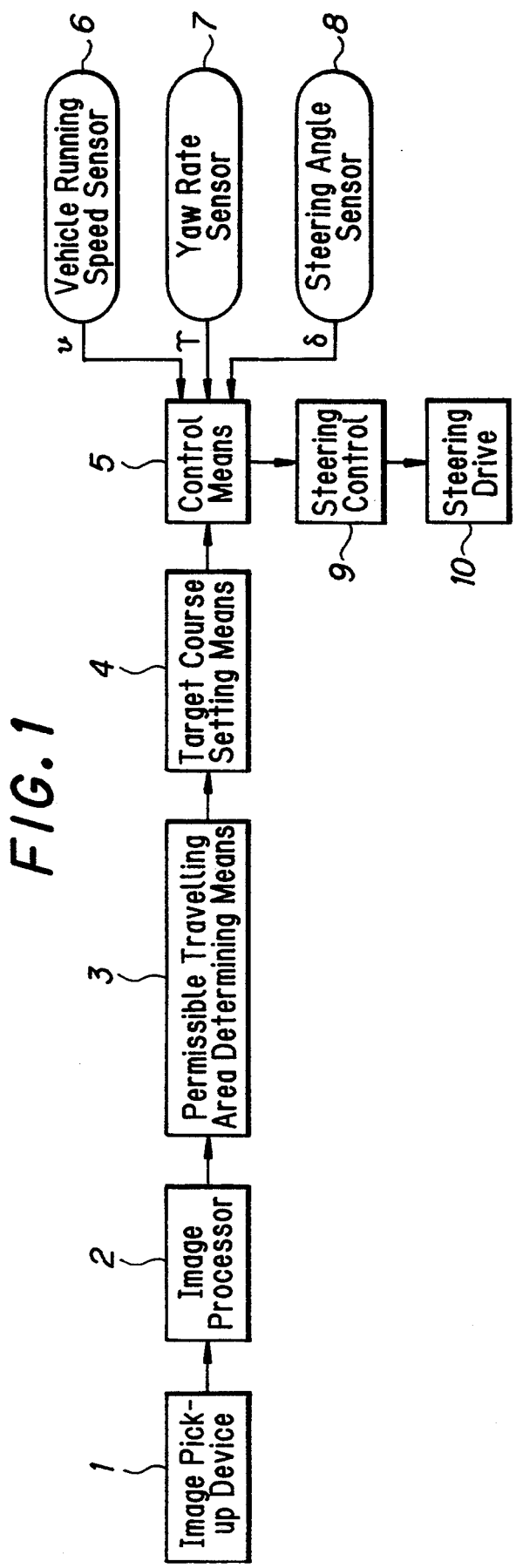
FIG. 1 is a block diagram showing a structure of an automatic travelling apparatus embodying the present invention.

Referring now to the drawings, a preferred embodiment of the present invention will be described in detail as follows:

It will be observed from FIG. 1 that an automatic travelling apparatus according to the present invention comprises: an image pick-up device 1 such as a video camera attached to a vehicle for continuously generating an image of ground ahead of the vehicle; an image processor 2 for processing the images generated by the image pick-up device 1 to extract therefrom segments of continuous lines such as road edges and the like; permissible travel path determining means 3 for determining, on the basis of the obtained continuous line segments, a permissible travel path such as a road in the direction in which the vehicle is to travel; target course setting means 4 for setting a target course in the permissible travel path thus determined; control means 5 for determining the instantaneous running condition of the vehicle on the basis of an output signal from a speed sensor 6 representing the vehicle's running speed "v", an output signal from a yaw rate sensor 7 representing the yaw rate "Y" and an output signal from a steering angle sensor 8 representing the tire angle "δ" which varies with the steering of the vehicle, and for estimating, on the basis of the instantaneous running condition, a steering correction necessary to permit the vehicle to follow the target course; and steering control means 9 (and a steering drive 10) for steering the vehicle with reference to the steering correction.

Actually, a microcomputer aided control is used in place of the image processor 2, the permissible travel path determining means 3, the target course setting means 4, and the control means 5; and the steering control means 9 can be included in the microcomputer aided control, if occasions demand.

The extraction of continuous line segments such as road edges from the generated image in the image processing means 2 can be made as follows:

First, each image supplied from the image pick-up device 1 is subjected to a differentiation process for detection of the road edges. Then, an automatic threshold setting circuit in the image processing means 2 sets an optimum threshold value in consideration of the degree of shade of the road edge image information just processed. Then, the road edge image will be subjected to binary transformation.

Alternately, first, the images may be subjected to binary transformation, and then the binary data may be subjected to differentiation. In place of binary transformation polydigitization may be performed to express some shade details of the image.

Figure 2:
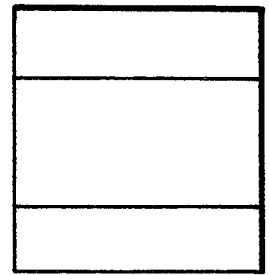
FIG. 2 shows a line segment of a road obtained on the basis of processing an image taken by a video camera.

Digitalized image information will be subjected to Hough conversion to convert the X-Y linear coordinates to $\rho$-$\theta$ point coordinates, thus transforming the isolated points into continuous line segments of the road edges as shown in FIG. 2.

Figure 10:
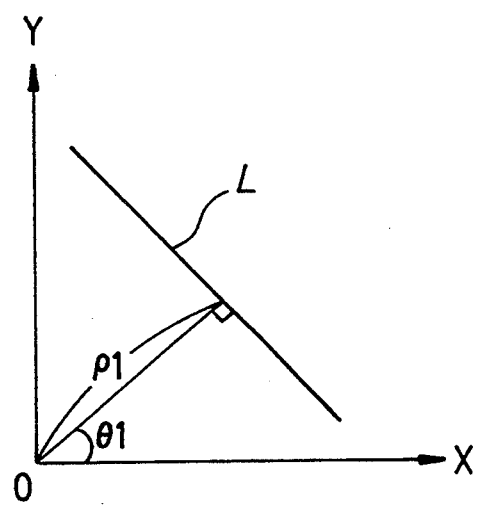
FIG. 10 shows a line segment in the X-Y coordinates.
Figure 11:
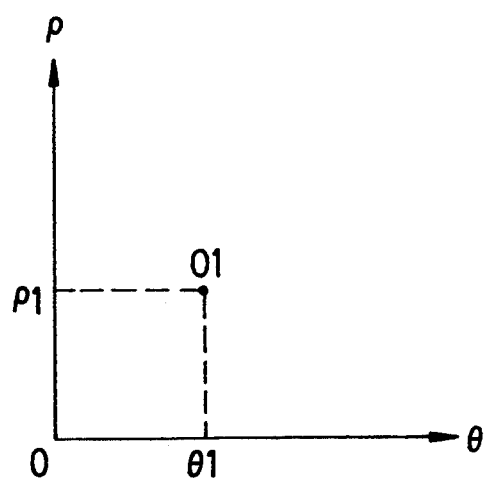
FIG. 11 shows a point on the p-8 point coordinates obtained by the Hough conversion of the line segment shown in FIG. 10.

The symbol $\theta$ stands for an angle formed between the X-axis and a perpendicular from the origin of the X-Y coordinate system to a line segment. The symbol $\rho$ stands for the length of the normal line. For instance, the line L in the X-Y coordinate system depicted in FIG. 10 is expressed as the point 01 in the $\rho$-$\theta$ point coordinate system depicted in FIG. 11.

In this fashion, edge tracing may be performed on the basis of binary-coded image information to obtain a continuous road edge. The Hough conversion, edge tracing and other appropriate processings may be performed simultaneously. Then synthetic judgement may be made on the results of these processings to obtain precise road edge information. More accurate road edge information may be taken out when the above-mentioned image processings are made with developing an input image area as the vehicle travels.

Figure 3:
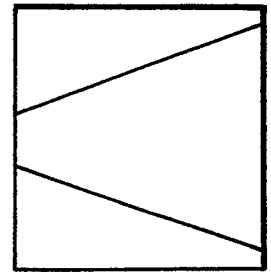
FIG. 3 shows an image obtained by projective transformation of the image shown in FIG. 2.

The image taken by a video camera represents a perspective view. The perspective road edge image as shown in FIG. 2 can be converted to a non-perspective road edge image as shown in FIG. 3 according to known projective conversion processes.

The permissible travel path determining means 3 has projective conversion characteristics set in accordance with the perspective characteristics of an associated video camera.

Figure 4:
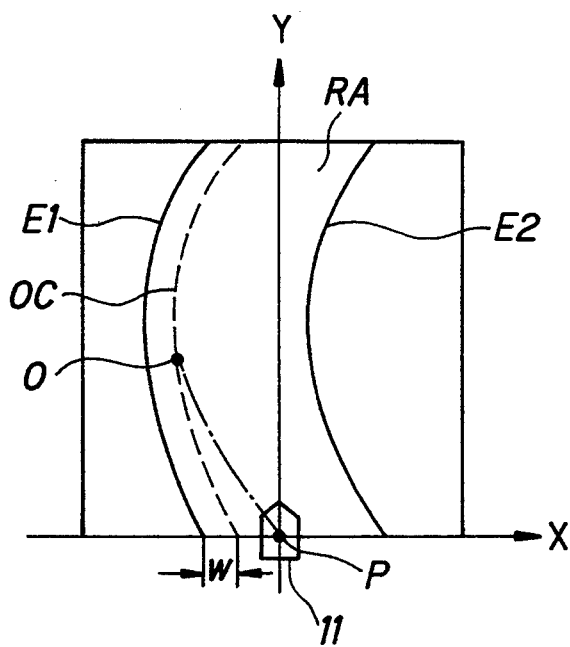
FIG. 4 shows an example of a target course set in a permissible area within a road width.

The permissible travel path determining means 3 can determine, based on the non-perspective road image obtained by projective conversion, for example, an area between the continuous road edges E1 and E2 shown in FIG. 4. This area comprises a permissible travel path RA in the X-Y coordinate system wherein the Y-axis corresponds to the direction in which the image is pictured by the image pick-up device 1, i.e., the direction in which the vehicle travels.

In FIG. 4, a current or instantaneous position of the vehicle 11 is indicated at a point "P", and the video camera of the image pick-up device 1 is mounted at a predetermined position on the vehicle such that the point "P" will appear at the center lower point of the display screen as the origin of the X-Y coordinate system.

After a permissible travel path is determined by the permissible travel path determining means 3, the target course setting means 4 will select a course most appropriate for running in the permissible travel path, and will set the so selected course as a target course to follow.

Preferably, the course will be determined based on the road contour and the running speed of the vehicle. However, the course may be basically determined based on the width of the road as follows:

If the target course setting means 4 finds that the width of the road exceeds a predetermined value, and that vehicles must keep to the left, a target course OC will be set a given constant distance "w" (for instance, 1.5 meters) from the left edge of the road, as shown in FIG. 4.

If the width of the road is below the predetermined value, a target course will be set along the center line (not shown) of the road.

The coordinates of the target course are stored in the memories of the target course setting means 4 and are continuously recalculated as the vehicle is running. The divisions of the X-Y coordinates for the permissible travel path and the target course are selected in accordance with the magnification of the video camera of the image pick-up device 1.

In FIG. 4, the trace of the vehicle from "P" to "O" represents the course actually followed by the vehicle under the control of the control means 5 until the vehicle has come to the target course OC at the point 0.

According to the present invention, it is also possible to set a target course based on the running condition of the vehicle as follows:

If the target course setting means 4 finds that the running speed measured by the speed sensor 6 is below a predetermined speed, the target course OC will be set in conformity with the road contour as seen from FIG. 4.

Figure 5A:
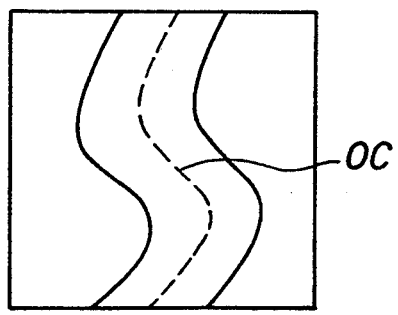
FIGS. 5(a) and 5(b) show target courses set on a road which a vehicle is to travel at a low speed (a) and a high speed (b) respectively.
Figure 5B:
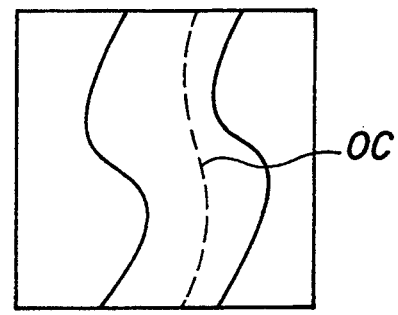
Figure 6:
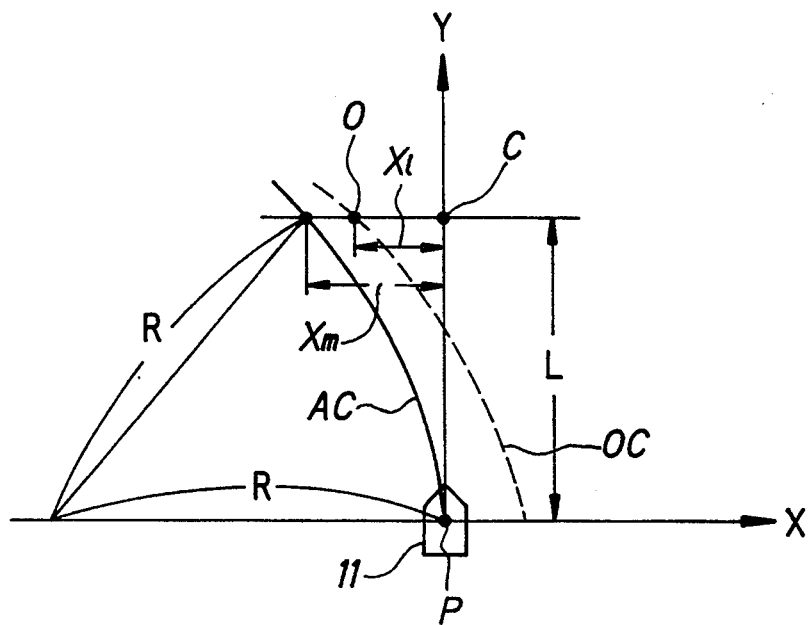
FIG. 6 shows a relationship between a target course and a presumed course.

When the running speed of the vehicle is higher than a predetermined speed, and when the vehicle is running along a curved road as shown in FIG. 5(b), a target course OC of reduced curvature is set so as to reduce the lateral force which is applied to the vehicle.

After setting a target course in the road, the control means 5 will calculate a steering correction necessary to permit the vehicle to follow the target course as follows:

The steering correction relates to a steering angle of the vehicle, and the control means 5 presumes a course which the vehicle will run along based on the currently detected running condition of the vehicle. The control means 5 then calculates a deviation between the presumed running course and the target course, and determines a steering correction necessary for bringing the vehicle to follow the target course. Finally, the steering control means 5 adjusts the steering control of the vehicle according to the steering correction.

In practice, for example, the position the vehicle will attain is represented as a point in the X-Y coordinate system where the Y-axis represents the running direction of the vehicle, and the lateral deviation of the represented point from the point of target position is measured to finally determine therefrom a corresponding amount of steering angle to be corrected.

Now it is assumed that a vehicle 11 at Point "P" is controlled to get on the target course OC.

First, the distance L (m) (L=v×T) on the Y-axis which the vehicle can run in T seconds will be determined on the basis of the vehicle's running speed v (m/s) which is determined by the speed sensor 6. Then, the lateral deviation xl from Point "C" (on which the vehicle would be in T seconds if it travelled straight along the Y-axis by the distance L) to the target course OC will be estimated.

Second, the course AC which the vehicle is supposed to follow will be estimated from the yaw rate T (rad/sec), and then the lateral deviation xm from Point "C" to the presumed course AC will be estimated by the following equation:

$$xm \div R - \{R^2 - (v \times tm)^2\}^{\frac{1}{2}}$$
$$= R - R\{1 - (v \times tm/R)^2\}^{\frac{1}{2}}$$

where R stands for a radius of the presumed course AC. When $R >> v \times tm$, we obtain $$xm = R - R\{1 - (v \times tm/R)^2/2\} \quad (1)$$
$$= v^2 \times tm^2/2R$$
$$= L^2/2R$$

$$T = v/R \quad (2)$$

From Equations (1) and (2)

$$xm = L^2Y/2v \quad (3)$$

A positive sign of yaw rate Y represents that the presumed course AC turns to the left whereas a negative sign indicates the presumed course turning to the right.

The yaw rate ΔY to which the yaw rate of the vehicle is to be corrected will be determined from the following equation:

$$\Delta Y = e \times 2v/L^2 \quad (4)$$

Figure 7:
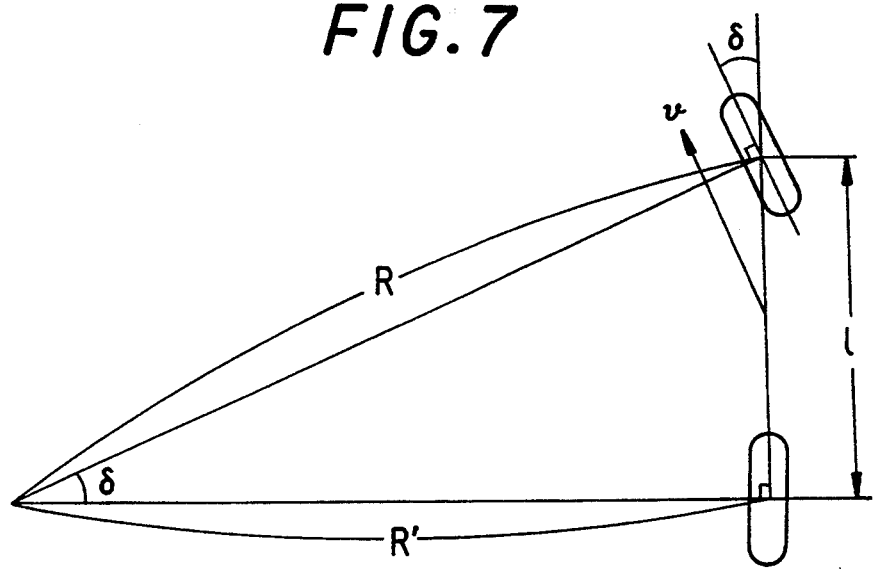
FIG. 7 shows a relationship between a vehicle's steering angle and its turning radius.

Then, based on the tire angle a detected at Point "P" by the steering angle sensor 8, the steering correction δ' for permitting the vehicle to get on the target course OC can be determined as follows:

Referring to FIG. 7, when $R >> 1$, the following equation can be obtained;

$$\delta = l/R \quad (5)$$

From equations (2) and (5) we can derive $$\delta = (l/v)Y \quad (6)$$

where l stands for a wheelbase. According to equation (6) the tire angle Δδ for correction in accordance with the yaw rate ΔY to be corrected can be given by the following equation:

$$\Delta\delta = (l/v)\Delta Y \quad (7)$$

Substituting $l = (1 + Kv^2)$ into the equation (7), we can obtain $$\Delta\delta = \Delta Y\{l(1 + Kv^2)/v\} \quad (8)$$

where "K" is a constant which is determined both from the tire characteristics and the vehicle characteristics.

Therefore, a steering correction δ' for permitting the vehicle to get on the target course can be obtained by the following equation:

$$\delta' = \delta + \Delta\delta \quad (9)$$

In response to the steering amount δ' given from the control means 5 the steering control means 9 issues a drive command to the steering drive 10 which in turn steers the vehicle toward the target course OC.

The above-mentioned processing operations will be repeated at specified intervals such that the steering control of the vehicle may be continuously performed and will permit the vehicle to follow the target course OC set in the permissible travel path. It may be noted that the permissible travel path is recalculated during each control cycle.

The automatic travelling apparatus according to the present invention further includes means for repeatedly recalculating the vehicle position relative to the permissible travel path during each current control cycle. The recalculations are based on the instantaneous running condition of the vehicle. Further, means are provided for resetting the target course in response to the recalculated vehicle position. Finally, a steering correction for permitting the vehicle to follow the reset target course will be determined.

The above-mentioned means is practically included in the control means 5 shown in FIG. 1.

Figure 8:
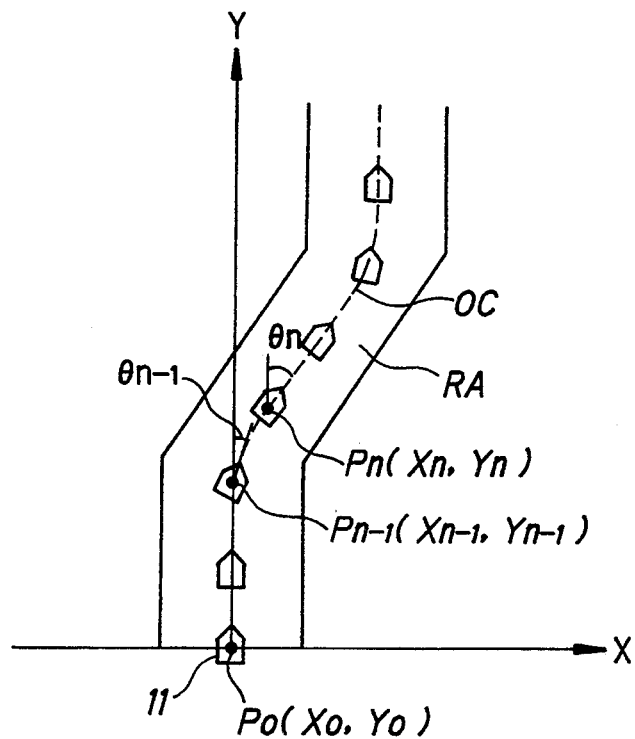
FIG. 8 shows a travelling state of a vehicle in a permissible travelling area.

If a permissible travel path RA is established for one control cycle in the X-Y coordinates and a vehicle 11 is positioned at Point P (Xo, Yo), i.e., at the origin of the X-Y coordinates at the beginning of said control cycle as shown in FIG. 8, the vehicle position Pn (Xn, Yn) (n=1, 2, 3, ... ) in X-Y coordinates, which varies with time as the vehicle runs, is estimated from the running speed "v" and the yaw rate "Y" (i.e. angular velocity increment in yawing direction) which are detected respectively by a running speed sensor 6 and a yaw rate sensor 7 at an interval of an unit time Δt preset shorter than the image processing time, and thereby said position may be recalculated successively in relation to the permissible travel path RA. In FIG. 8, "OC" designates a target course set at an initial stage of the control cycle.

$$\left.\begin{array}{l} Xn = Xn - 1 + \Delta L \cdot \cos\Delta\theta \\ Yn = Yn - 1 + \Delta L \cdot \sin\Delta\theta \end{array}\right\} \quad (10)$$

where ΔL is a distance which the vehicle travels for a unit time and can be determined by the following equation:

$$\Delta L = v \cdot \Delta t \quad (11)$$

$\Delta\theta (=\theta n - \theta n - 1)$ is an change of the vehicle running direction for the unit time, which is determined by the detected value of yaw rate Y as follows:

$$\Delta\theta = Y \cdot \Delta t \qquad (12)$$

The target course for the renewed position Pn (Xn, Yn) of the vehicle is reset with respect to the permissible travel path RA, and a steering correction is also estimated with respect to the reset target course so as to steer the vehicle toward the target course.

Figure 9A:
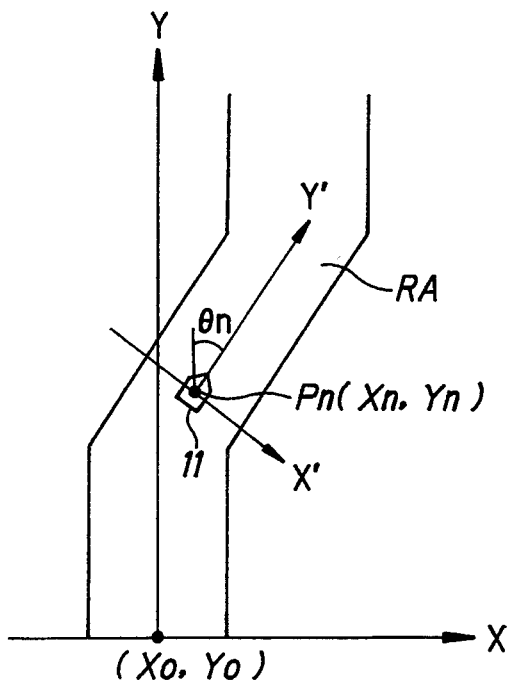
FIG. 9(a) shows a position and a running direction of a vehicle in a permissible travelling area at a certain time.
Figure 9B:
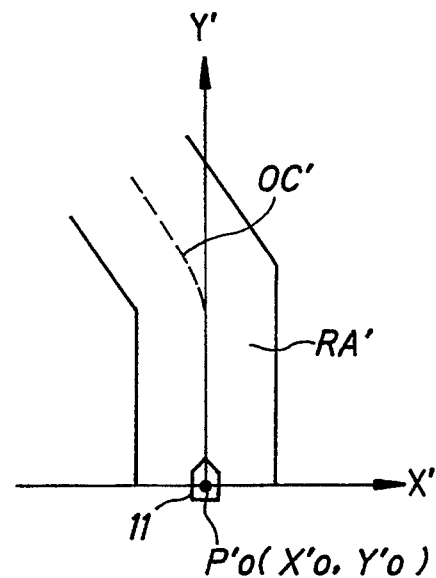
FIG. 9(b) shows a state obtained by coordinate transformation of a permissible travelling area in relation to a position and a running direction of a vehicle in a permissible travelling area.

As shorn in FIGS. 9(a) and 9(b), a new X'-Y' coordinate system in which the Y'-axis stands for the axis of running direction of the vehicle 11 at the recalculated position Pn is formed, and then coordinate transformation of every points of the permissible travel path RA' and the target course OC' is carried out in such a way that the renewed point Pn (Xn, Yn) in the X-Y coordinate system may be placed to the origin Po' (X', Y').

Namely, each point shown in FIG. 9(a) is shifted respectively by $(-\Delta L \cdot \cos \Delta\theta, -\Delta L \cdot \sin \Delta\theta)$ and the permissible travel path pattern RA and the target course pattern OC are turned respectively by $-\Delta\theta$, with the result that the axis of the vehicle running direction coincides with the Y'-axis of the X'-Y' coordinate system and vehicle 11 is positioned at the origin of said coordinate system.

Then, a steering correction for permitting the vehicle 11 to follow the target course OC' is determined with reference to the X'-Y' coordinate system in the same manner as mentioned above, and the steering control will be performed with reference to said recalculated steering amount.

The steering correction for permitting the vehicle to follow the target course OC initially set in the permissible travel path RA was estimated from the variable data as aforementioned.

Accordingly, when a vehicle 11 is steered from an initial position Po with the initially estimated steering correction for a relatively long period of time, (i.e., over a relatively long control cycle) the vehicle may progressively deviate from the target course OC due to the error included in the steering correction estimation.

The present invention provides a means for minimizing such deviation. For example, in one control cycle a target course OC' can be reset in a permissible travel path RA' based on the vehicle's present position. Thus, the steering control of the vehicle 11 can be carried out with a higher accuracy according to the steering correction newly estimated for the recalculated target course. Since the interval between renewals of the steering correction is relatively short, the error of estimation may have no practical influence to the steering control.

According to the present invention, it is also possible to optimally change the target course with a change of the vehicle running speed in one control cycle in case the target course is set in a permissible travel path depending on the vehicle's running speed as shown in FIGS. 5(a) and 5(b).

Figure 12:
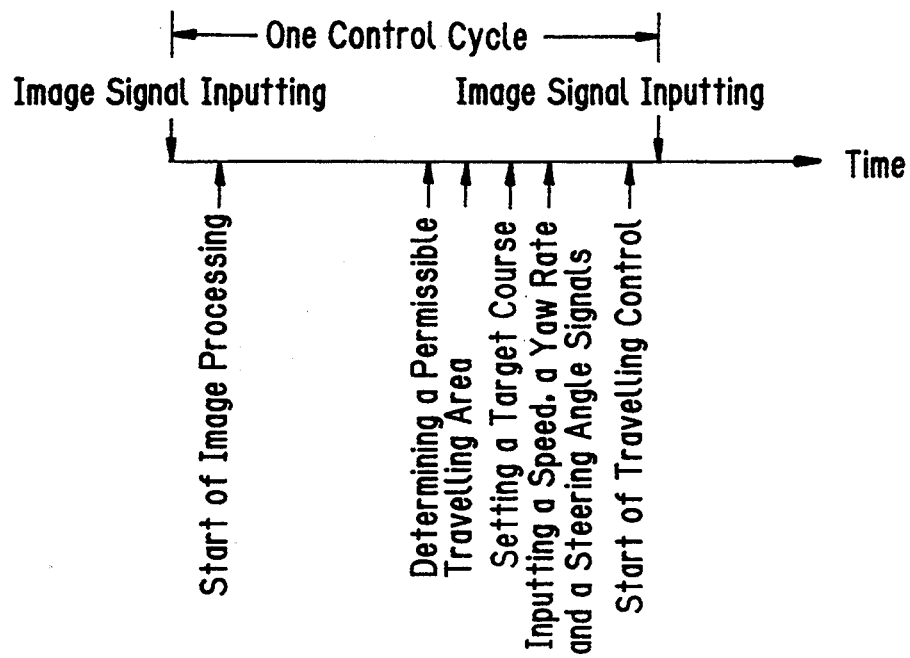
FIG. 12 shows timings of processings in one control cycle.

FIG. 12 is a timing chart showing each processing timing in one control cycle.

Figure 13:
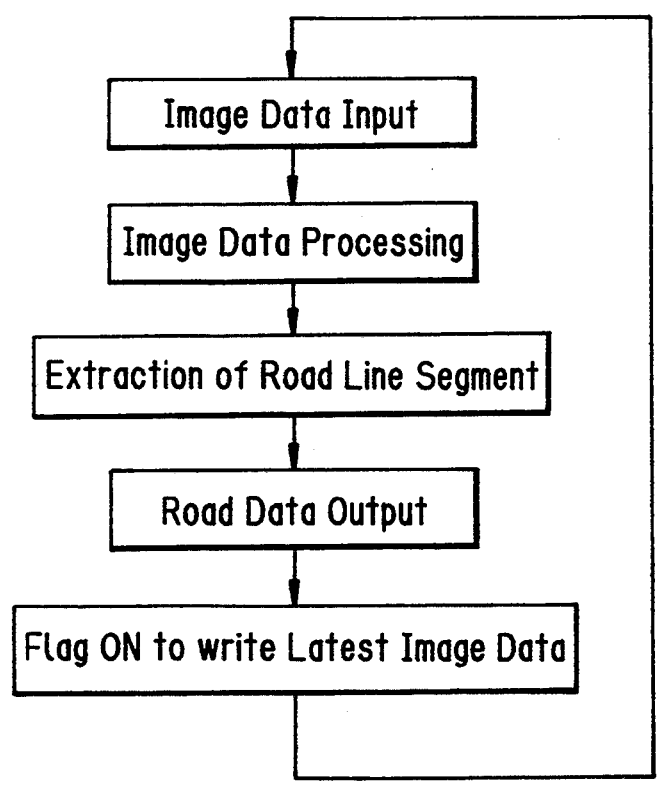
FIG. 13 shows a flow chart of image processing.
Figure 14:
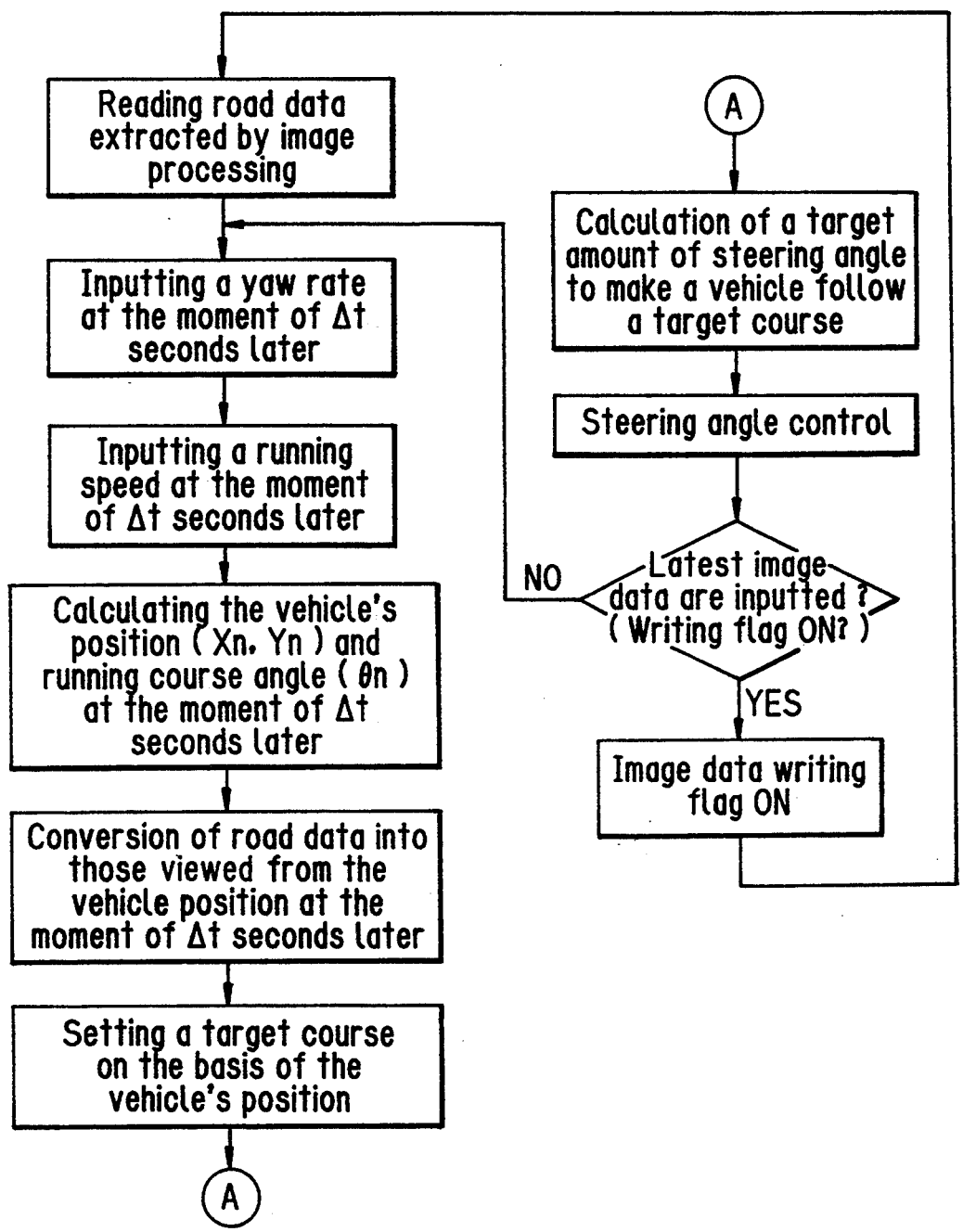
FIG. 14 shows a flow chart of updating the vehicle position during image sampling.

FIG. 13 shows a flow of image processing, and FIG. 14 shows a flow of renewing the vehicle position during the image processing.

As is apparent from the foregoing description, the automatic travelling apparatus according to the present invention offers such an advantage that in each steering control cycle comprising the following steps—sampling an image of an area ahead of a running vehicle (said image being taken by the image pick-up means attached to the vehicle); processing sampled data and extracting therefrom continuous line segments; determining a permissible travel path ahead of the vehicle based on the continuous line segments extracted; setting a target course in the permissible travel path thus determined; detecting the instantaneous running condition of the vehicle; estimating, on the basis of the instantaneous running condition, a steering correction to permit the vehicle to follow the target course; and steering the vehicle with reference to the steering amount, —the automatic travelling apparatus of the present invention can recalculate, on the basis of the instantaneous running condition of the vehicle during a period of image sampling, the preceding position of the vehicle in the determined permissible travel path and reset a target course in the permissible travel path in relation to the recalculated position. Thus, the image sampling period, i.e., the steering control cycle can be shortened to increase the steering control accuracy of that apparatus and the steering control can be carried out at constant intervals irrespective of possible variations of image processing period.

What is claimed is:

1. A machine implemented process for controlling a vehicle, said process comprising the steps of:
   generating image data representative of an area ahead of a vehicle in a direction of travel of said vehicle;
   sampling and processing said generated image data at repeated intervals to extract therefrom continuous line segments indicative of a permissible travel path in said area ahead of said vehicle;
   detecting an instantaneous running condition of said vehicle;
   repeatedly calculating a present position of said vehicle and repeatedly setting a target course in said permissible travel path between each of said sampling and processing intervals;
   determining, based on said instantaneous running condition of said vehicle, a steering correction necessary to permit said vehicle to follow each of said target course settings; and
   steering said vehicle in response to each determined steering correction.

2. An automatic vehicle control system comprising:
   means for generating image data representative of an area ahead of a vehicle in a direction of travel of said vehicle, said means for generating said image data being adapted to be attached to said vehicle;
   means for sampling said processing said generated image data at repeated intervals to extract therefrom continuous line segments indicative of a permissible travel path in said area ahead of said vehicle;
   means for detecting an instantaneous running condition of said vehicle;
   means for repeatedly calculating a present position of said vehicle and repeatedly setting a target course in said permissible travel path between each of said sampling and processing intervals;
   means for determining, based on said instantaneous running condition of said vehicle, a steering correction necessary to permit said vehicle to follow each of said target course settings; and
   means adapted for steering said vehicle in response to each determined steering correction.

3. The automatic vehicle control system of claim 2 wherein said instantaneous running condition of said vehicle is determined as a function of a running speed of said vehicle and a yaw rate of said vehicle.

* * * * *